(12) United States Patent
Cummins

(10) Patent No.: US 8,840,122 B1
(45) Date of Patent: Sep. 23, 2014

(54) REFUSE COLLECTION DEVICE

(76) Inventor: Wallace L. Cummins, Coatesville, PA (US)

( * ) Notice: Subject to any disclaimer, the term of this patent is extended or adjusted under 35 U.S.C. 154(b) by 0 days.

(21) Appl. No.: 13/134,516

(22) Filed: Jun. 9, 2011

Related U.S. Application Data

(60) Provisional application No. 61/397,591, filed on Jun. 14, 2010.

(51) Int. Cl.
*B62B 11/00* (2006.01)

(52) U.S. Cl.
USPC ................................... 280/47.35

(58) Field of Classification Search
USPC ........................ 312/249.13; 211/113
See application file for complete search history.

(56) References Cited

U.S. PATENT DOCUMENTS

| | | | | |
|---|---|---|---|---|
| 3,162,462 A | * | 12/1964 | Elders | 280/47.35 |
| 4,165,088 A | * | 8/1979 | Nelson | 280/47.35 |
| 5,361,978 A | * | 11/1994 | Monroe | 232/43.1 |
| 5,380,033 A | * | 1/1995 | Harling | 280/654 |
| 5,390,944 A | * | 2/1995 | Sherwin | 280/47.35 |
| 5,419,452 A | * | 5/1995 | Mueller et al. | 220/495.08 |
| 5,474,192 A | * | 12/1995 | Hartzell | 211/90.04 |
| 5,704,496 A | * | 1/1998 | Latta | 211/70.6 |
| 5,833,250 A | * | 11/1998 | Schier et al. | 280/47.19 |
| 5,881,891 A | * | 3/1999 | Murphy, Jr. | 211/70.6 |
| 7,240,910 B2 | * | 7/2007 | Stuemke | 280/79.5 |
| 7,467,801 B1 | * | 12/2008 | Garduno | 280/47.26 |
| 2002/0109318 A1 | * | 8/2002 | Calmeise et al. | 280/47.35 |
| 2002/0185831 A1 | * | 12/2002 | Chan | 280/47.26 |
| 2003/0122331 A1 | * | 7/2003 | DiGiacomo et al. | 280/47.35 |
| 2006/0157946 A1 | * | 7/2006 | Stuemke | 280/79.5 |
| 2006/0232033 A1 | * | 10/2006 | Pint | 280/79.2 |
| 2007/0209597 A1 | * | 9/2007 | Brock et al. | 119/51.01 |
| 2007/0210546 A1 | * | 9/2007 | Presnell et al. | 280/47.35 |

* cited by examiner

*Primary Examiner* — John Walters
*Assistant Examiner* — James Triggs
(74) *Attorney, Agent, or Firm* — John F. A. Earley, III; Frank J. Bonini, Jr.; Harding, Earley, Follmer & Frailey, P.C.

(57) ABSTRACT

An improved refuse collection device having a compartment for refuse collection and having various holding components for storing items such as replacement toilet paper and hand towels, for holding rolls of trash bags, and for holding cleaning items, such as, for example, mops and brooms.

25 Claims, 6 Drawing Sheets

REFUSE COLLECTION DEVICE

CROSS REFERENCE TO RELATED APPLICATIONS

The benefit under 35 U.S.C. §119(e) of U.S. Provisional Patent Application Ser. No. 61/397,591 filed on Jun. 14, 2010 is hereby claimed, and U.S. Provisional Patent Application Ser. No. 61/397,591 is incorporated herein by reference in its entirety.

BACKGROUND OF THE INVENTION

1. Field of the Invention

The invention relates to maintenance and janitorial equipment, and more particularly, to a refuse holder which is designed to hold refuse as well as store and transport janitorial supplies.

2. Brief Description of the Related Art

Equipment for holding and transporting cleaning items is commercially available. One example of a bucket having storage receptacles is shown in my U.S. Design Pat. No. 350,632 which was issued on Sep. 13, 1994. Cleaning supplies, such as for example, spray bottles, towels, brushes and sponges, as well as other cleaning items suited to the type of maintenance/cleaning to be performed, may be required to be carried from room to room, such as, in office complexes, hotels, schools and other buildings.

One typical holder for janitorial supplies is a janitorial cart, which generally have open shelves for placement of items thereon, and wheels to facilitate moving the items.

Large trash cans often are used by janitorial staff to empty smaller waste baskets or refuse containers in offices, schools, homes, hospitals and other locations.

A need exists for an improved device which may be used to collect refuse, and at the same time, may hold and transport janitorial supplies.

SUMMARY OF THE INVENTION

An improved refuse collection device is provided having a compartment for refuse collection and storage components for storing items. According to a preferred embodiment, the refuse collection device has storage components provided on its exterior. A handle preferably is provided to facilitate transporting the refuse device and janitorial supplies or collected refuse from one location to another.

The refuse collecting device further provides specially configured components and/or compartments for holding and storing items. For example, embodiments of the device may be configured to be particularly suitable for a variety of cleaning applications. Alternately, the refuse collecting device may be constructed for one or more particular applications, such as, for example, bathroom cleaning applications.

Preferably, the refuse collecting device is water resistant and is constructed to prevent escape of materials collected therein. A preferred construction of the refuse collection device includes a refuse collection compartment, and has a holder on an exterior of the device for holding a bucket, such as a bathroom cleaning bucket, that may be transported with the refuse collecting device.

The refuse collection device may be used in connection with a variety of cleaning applications, and the holding components may be configured to hold and store janitorial supplies, such as, for example, towels, rags, sponges, a supply of trash bags, towels and toilet paper rolls (for replacement in bathroom cleaning applications), as well as other bathroom cleaning items. The configuration of the device facilitates holding the items in a single place so they are readily accessible when needed.

The refuse collection device preferably is constructed so that the device and items held thereby may be easily moved from place to place.

Another feature is that according to preferred embodiments, the placement of the holding component features facilitate access and use of the items that may be held, such as a roll of towels, bucket, and other janitorial supplies.

According to preferred embodiments, the refuse collection device is configured to hold trash bags of different sizes.

These and other advantages are provided by my invention.

BRIEF DESCRIPTION OF THE DRAWING FIGURES

Figure 1:
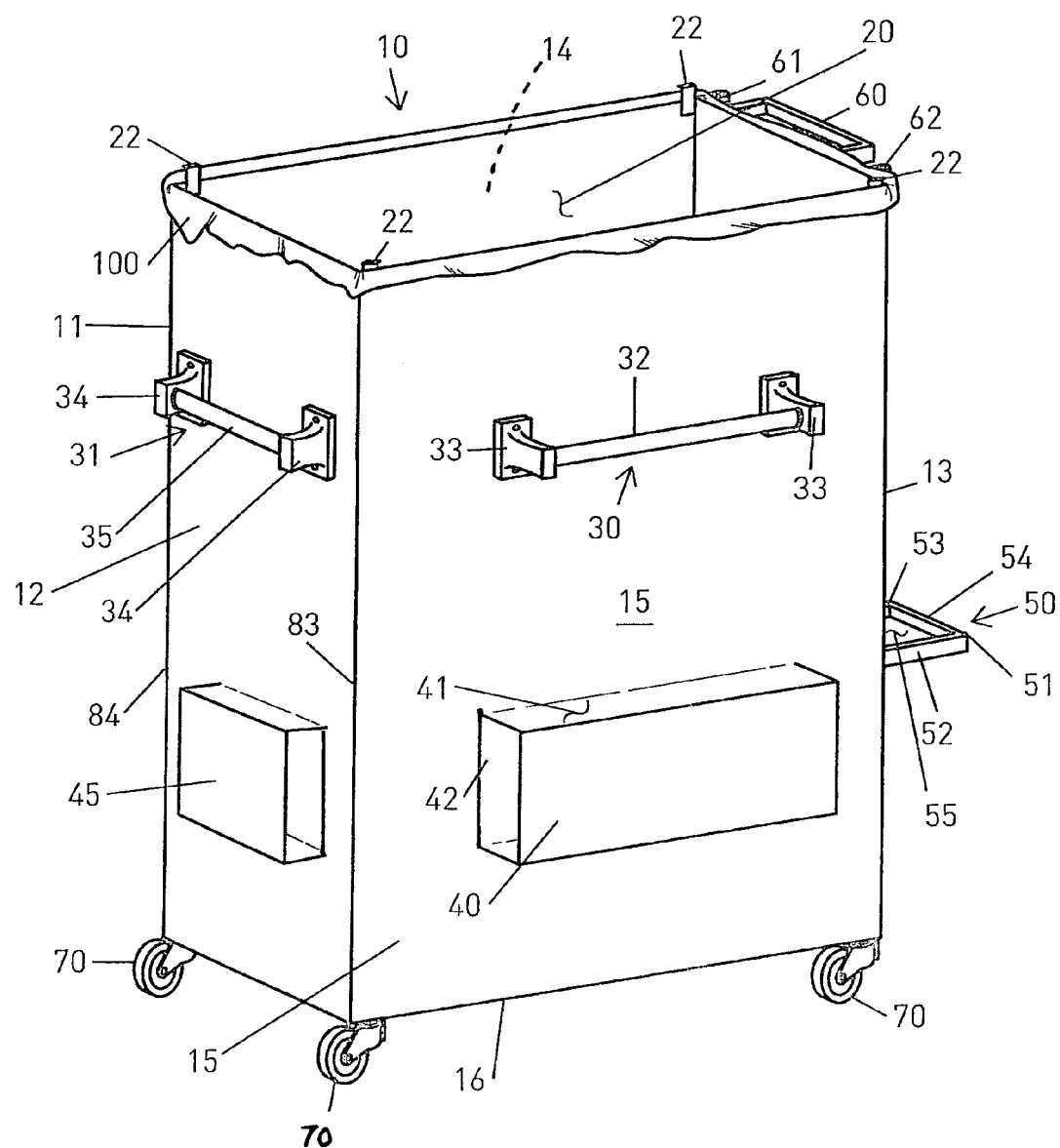
FIG. 1 is a perspective view, looking down from the top left side, of a refuse collecting device according to a first embodiment.
Figure 2:
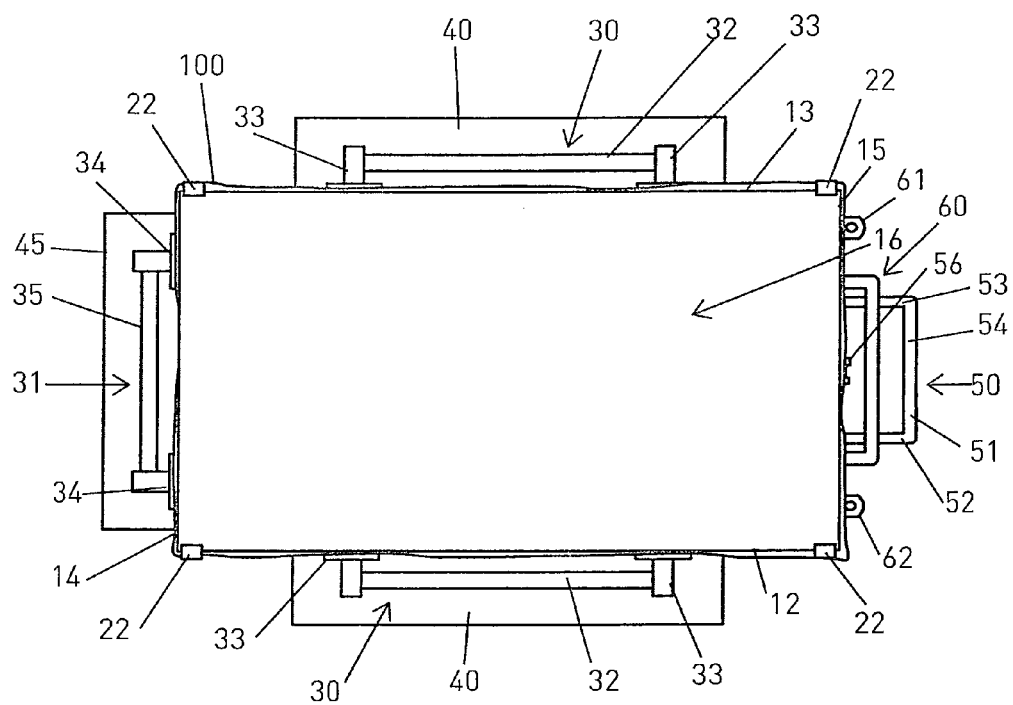
FIG. 2 is a top plan view of the device of FIG. 1.
Figure 3:
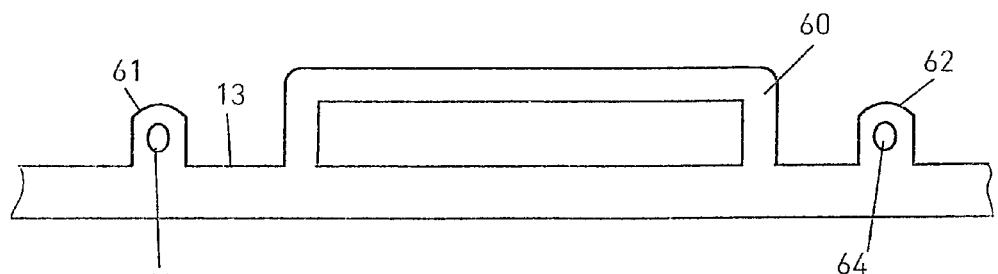

FIG. 3 is an enlarged partial view in top plan showing the handle 60 and holding components 61 and 62 of the rear wall 13 of the device of FIGS. 1 and 2. In this drawing, the bucket holder 50 and the holding component 56 have been omitted from the drawing to simplify the drawing.

Figure 4:
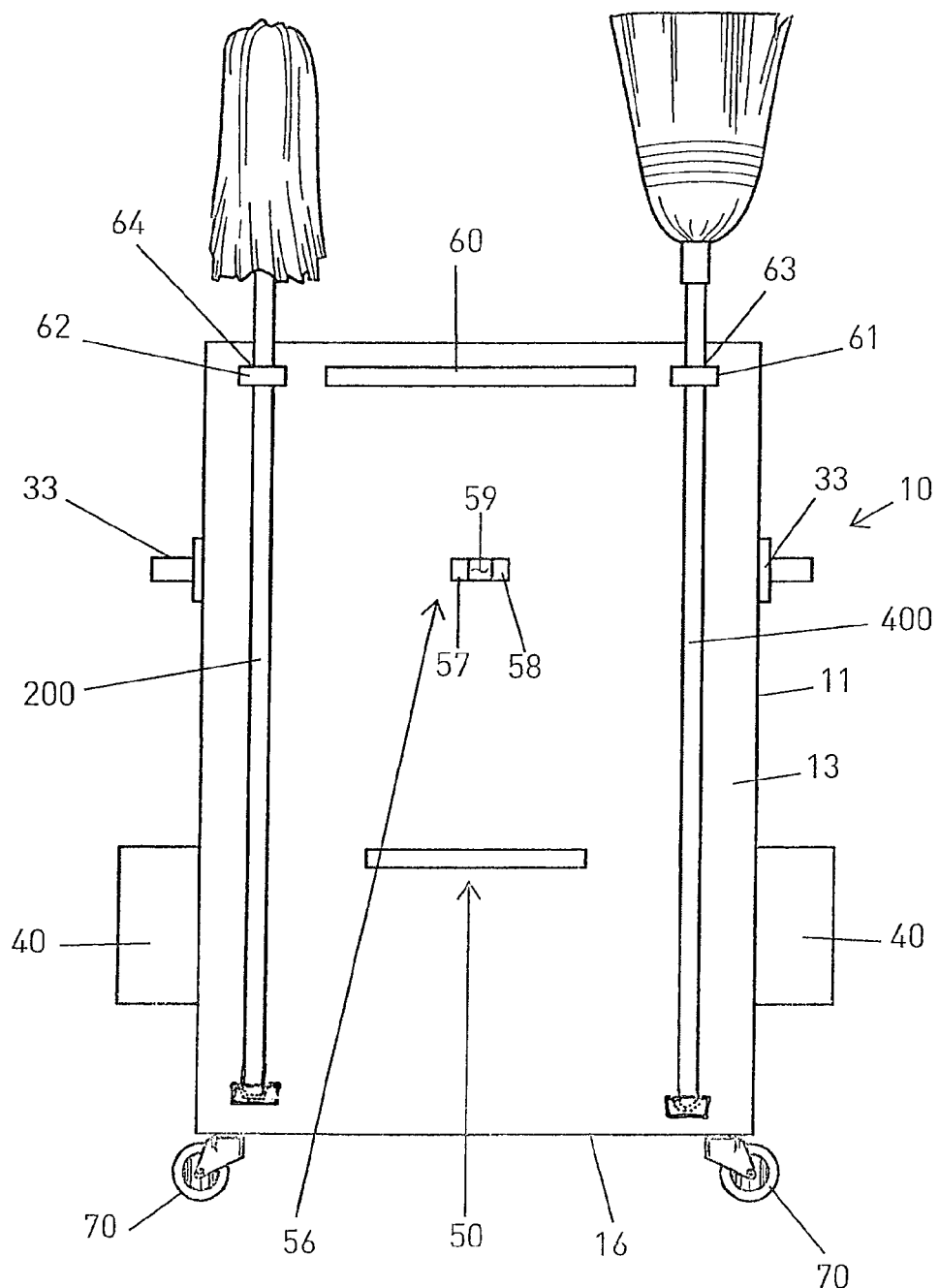

FIG. 4 is a rear elevation view of the refuse collecting device of FIG. 1, illustrated with a broom and mop being held by holding components of the device.

Figure 5:
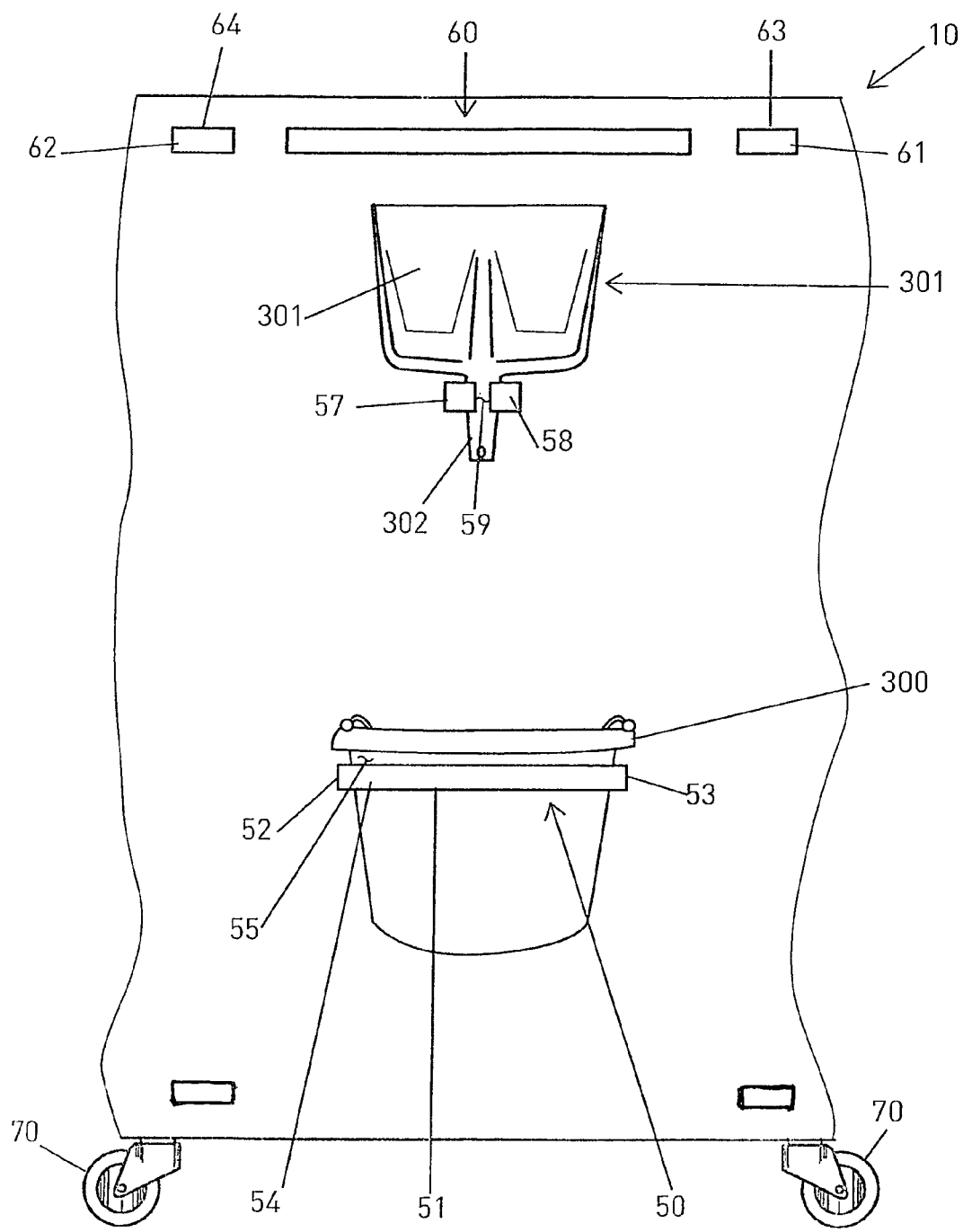

FIG. 5 is an enlarged partial view taken in rear elevation showing a first holding component formed on the rear wall of the device shown in FIG. 4 configured to hold a bucket, with a bucket being held by the first holding component, and showing a second holding component formed on the rear wall of the device shown in FIG. 4 configured to hold a dust pan, with a dust pan being held by the second holding component.

Figure 6:
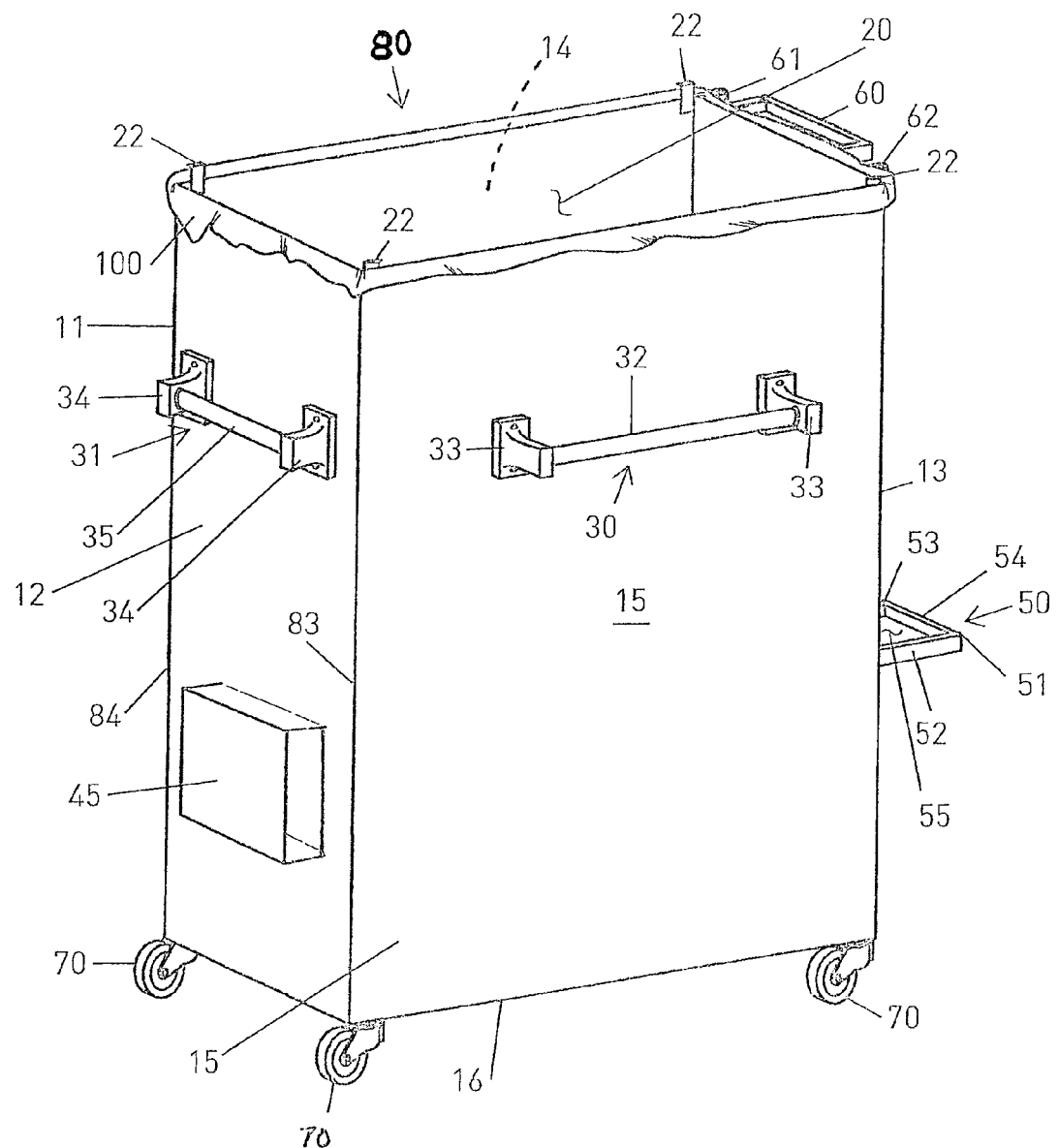

FIG. 6 is a view in perspective of an alternative embodiment of the inventive refuse collecting device.

Figure 7:
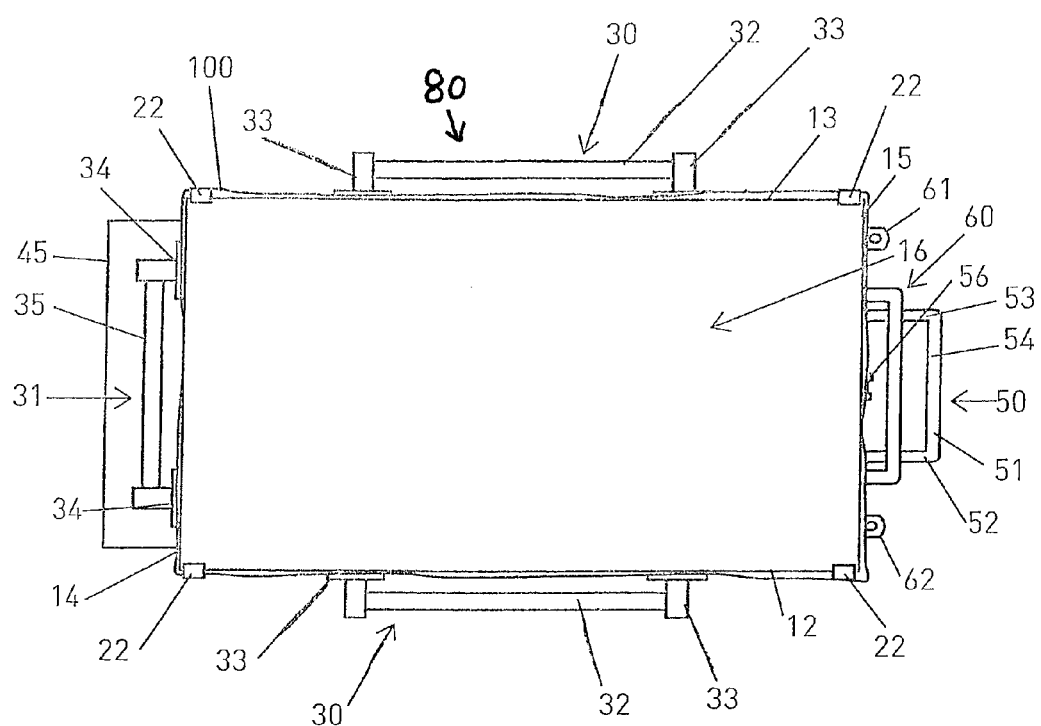

FIG. 7 is a top plan view of the device of FIG. 7.

DETAILED DESCRIPTION OF THE PREFERRED EMBODIMENTS

Referring to FIGS. 1-5, there is illustrated a refuse collection device 10 constructed in accordance with a preferred embodiment of my invention. The refuse collection device 10 is shown constructed as a walled enclosure 11 formed by a front wall 12, a rear wall 13, a left side wall 14, right side wall 15 and a floor or base 16. The front wall 12, the rear wall 13, the left side wall 14, the right side wall 15 and the floor or base 16 define a holding space 20 therein in which a trash bag 100 may be held.

Holding components, such as, for example, the plurality of hooks 22 may be provided for holding a trash bag 100 open in the space 20. As illustrated in FIG. 1, according to a preferred configuration, the hooks 22 may have an L-shaped shape and are connected to the walled enclosure 11, such as by being embedded into the top of the walls of the enclosure 11 preferably at the four corners formed where adjacent walls meet. Preferably, one or more additional sets of holding components are provided to accommodate retention of trash bags having different sizes. For example, according to the preferred embodiment shown in FIG. 1, one or more additional sets of hooks (not shown) may be provided at alternate locations (such as within the interior walls of the device) to hold trash bags that are smaller in size. Preferably, the hooks 22 may be used by placing the trash bag 100 over them, or alternatively, puncturing the bag 100 so that the hooks 22 poke through the bag 100.

Preferably, one or more holding rail components, such as the left and right holding rail components 30, and the front holding rail component 31, are provided to hold supplies, such as, for example, a roll of trash bags (not shown), or a roll of paper towels. The right side and left side holding rail components 30 are each shown having a rail or rod 32 supported on the respective side wall 14, 15 with a pair of brackets 33. The brackets 33 are shown mounted to the side walls 14, 15, and optionally may be formed with the side walls 14, 15. The rod 32 may be an expandable rod, such as a spring rod constructed from two sections with a spring (not shown), or alternatively, may be a single structure that is configured to be press fit into the brackets 33 and removed from the brackets 33 when a change of the roll of bags or other items, is required. Alternately, other suitable brackets, such as arms, gravity held configurations and the like may be used, but preferably, the rod and item carried thereon are securely held so that when the device 10 is moved, the bags or other items do not fall off of the device 10. Preferably, the front side holding rail component 31 may be constructed similar to the left and right side holding rail components 30, or the various alternative constructions described herein. As shown in FIG. 1, according to an exemplary embodiment, the front holding rail component 31 includes a rail 35 and brackets 34. Preferably, the length of the holding rail components 30 and 31 may be provided in different lengths to match a variety of length of rolls of trash bags or paper towel rolls.

Preferably, at least one holding compartment 40 may be provided to hold items, such as toilet paper rolls, towels or other supplies that may be used in connection with janitorial services, such as providing replacement rolls of toilet paper and replacement towels to dry hands and such as products used for cleaning and refuse collection and disposal. The holding compartment 40 has a space 41 therein accessible by an opening 42. The compartment 40 preferably is molded in the right wall 15 of the device. The holding compartment 40 may be configured with a dimension and size suitable to accommodate toilet paper rolls, such as, for example, rolls having widths of 3½ inches or 4½ inches, and diameters which may be about 4½ inches for standard household toilet paper rolls, or about 9½ inches for larger generally commercial rolls. The opening 42 of the compartment 40 preferably projects about 5 inches from the side wall 15 for accommodating toilet paper rolls so that the rolls may be easily inserted through and withdrawn from the opening 42 of the compartment 40. Preferably, the compartment 40 has a length of about 20 inches and a depth of about 7 inches to permit multiple rolls of toilet paper to be stored in and transported with the container 10 until needed. Preferably, side wall 14 is also provided with a compartment 40 formed therein (e.g., preferably molded therewith), preferably having the same dimensions of the compartment 40 formed on side wall 15.

A compartment 45 is provided on the front wall 12 of the device 10 for facilitating holding items therein. Preferably the front holding compartment 45 is configured and dimensioned to hold paper towels, and more preferably the paper towels that are stacked and generally rectangular in shape. Since these paper towels generally often are supplied in bundles measuring about 6½ inches tall by 3½ inches wide by 10¼ inches in length, the front holding compartment 45 preferably may be configured with an opening that projects about 8 inches from the front wall 12, a length of about 20 inches, and a depth of about 8 inches so that the towel bundles may be placed and stored side by side and transported by the device 10, and removed when needed. The front holding compartment 45 may be constructed as described herein in connection with the side holding compartment 40. For example, the holding compartments 45 may be molded with the wall 12.

A bucket holder 50 is provided, and according to the preferred configuration shown in FIGS. 1 and 4, is shown on the rear wall 13. The bucket holder 50 according to a preferred configuration is provided as a generally u-shaped arm 51 that has two side portions 52, 53 and a connecting portion 54. Preferably, the arm 51 is connected to (or molded with) the walled enclosure 11, such as, for example, the rear wall 13. The arm 51 is preferably configured to define a space or opening 55 through which the lower part of a bucket 300 may be placed for holding and transporting with the device 10.

Referring to FIGS. 4 and 5, a holding component 56, preferably configured as a dust pan holder, is provided on an exterior wall of the receptacle 10. According to a preferred embodiment, the dust pan holder 56 is provided to be located above the bucket holder 50, preferably on the rear wall 13 of the receptacle 10. According to a preferred configuration, the dust pan holder 56 is configured having a pair of arms 57, 58 defining an opening 59. The handle 302 of a dust pan may be held by the holder 56. For example, the dust pan 301 may have a handle 302 which is situated on the holder 56 so that the handle 302 passes through the opening defined by the arms 57, 58.

The refuse collecting device 10 preferably includes a handle 60 for facilitating transport of the device 10 and the supplies and equipment held by the device 10. The handle 60 has a preferred configuration shown connected to the rear wall 13 so that a user may push the device 10 through hallways, rooms and other areas of a building. According to preferred embodiments, the handle 60 is provided near the top of the device 10 at a location convenient for a user to access. The handle 60 is shown connected to the rear wall 13, and according to a preferred configuration, is integrally molded with or into one or more components of the device 10, such as the rear wall 13, or enclosure 11. As illustrated in FIG. 3, according to a preferred embodiment, the handle 60 is integrally provided. Preferably, holding components, such as the holding components 61, 62, having slots or apertures 63, 64, respectively, for holding an item, such as a dust mop 200 and/or broom 400 (FIG. 4), may be formed on the receptacle 10, preferably integrally molded therewith. The holding components 61, 62 preferably may be integrally provided with the walled enclosure 11 or one or more of the walls, such as, the rear wall 13, as illustrated. Preferably, the apertures, 63, 64, are sized to accommodate the handle of a cleaning tool, such as, for example, a broom 400 or mop 200 that may be held with the holding components 61, 62.

The refuse collecting device 10 is movable. Preferably, wheels 70 are provided to facilitate moving the device 10. The wheels 70 (FIGS. 1 and 4) may be pivotally mounted so that they are able to pivot as the device 10 is moved to align themselves in a direction that the device 10 is being transported. According to alternate embodiments, one or more of the wheels 70 may be pivotally mounted, and others may be fixed. For example, one preferred configuration, not shown, may include pivotally mounted front wheels and fixedly mounted rear wheels. Optionally, one or more of the wheels 70 may be provided with a locking mechanism that may be actuated to lock a wheel in place, and consequently, release the lock when desired. Preferably, the wheels 70 are constructed from a corrosion and water resistant material which is not prone to rusting or being corroded by chemicals. The wheel mounting mechanism also preferably is constructed from materials which are corrosion and/or rust resistant.

The refuse collection device 10 shown and described herein, preferably may be constructed of suitable dimensions to fit through doorways. In one preferred configuration, the width of each wall 12, 13, 14, and 15 of the refuse collection device 10 is about 30 inches and the height of the refuse collection device 10 is about 40 inches, though alternative dimensions may be used. According to preferred embodiments, the refuse collection device 10 may be provided with rounded front side edges 83, 84 for facilitating movement of the device 10 and negotiation of obstacles that may be present when transporting the device 10.

Preferably, the refuse collection device 10 is constructed from materials which are water resistant, and also are resistant to general cleaners, such as typical cleaners used to clean furniture, toilets, glass, bathroom hardware and other fixtures.

Turning to FIGS. 6 and 7, there is shown a refuse collection device 80, which is an alternative embodiment of the invention. The refuse collecting device 80 is identical to the refuse collecting device 10 device described herein, except the refuse collecting device 80 is not provided with a holding compartment 40 on either of its side walls 14 and 15.

While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. A refuse collecting device comprising:
   a) a walled enclosure having an opening therein, an interior space and a floor;
   b) a holding component for holding a roll of trash bags or a roll of paper towels, the holding component for holding a roll of trash bags or a roll of paper towels comprising a pair of brackets individually directly integrally formed in the walled enclosure, and a rod removably mountable to and extending between the brackets for holding a roll of trash bags or a roll of paper towels surrounding the rod; and
   c) a storage component for holding cleaning supplies, the storage component for holding cleaning supplies comprising a compartment integrally formed on and with the walled enclosure, the compartment having a storage space accessible from the exterior of the device;
   wherein the walled enclosure is formed having a rear wall, a front wall, a left side wall, a right side wall, and a bottom,
   the storage compartment being integrally formed on and with the front wall of the walled enclosure, and further including
   a second storage compartment being integrally formed on and with the left side wall of the walled enclosure, and
   a third storage compartment being integrally formed on and with the right side wall of the walled enclosure,
   the holding component for holding a roll of trash bags or a roll of paper towels being integrally formed on the front wall of the walled enclosure, and further including
   a second holding component for holding a roll of trash bags or a roll of paper towels, the second holding component for holding a roll of trash bags or a roll of paper towels comprising a pair of brackets individually directly integrally formed on the left side wall of the walled enclosure, and a rod removably mountable to and extending between the brackets for holding a roll of trash bags or a roll of paper towels surrounding the rod, the second holding component being configured to be a different size than the holding component mounted on the front wall of the walled enclosure, and
   a third holding component for holding a roll of trash bags or a roll of paper towels, the third holding component for holding a roll of trash bags or a roll of paper towels comprising a pair of brackets individually directly integrally formed on the right side wall of the walled enclosure, and a rod removably mountable to and extending between the brackets for holding a roll of trash bags or a roll of paper towels surrounding the rod, the third holding component being configured to be a different size than the holding component mounted on the front wall of the walled enclosure and a different size than the holding component mounted on the left side wall of the walled enclosure.

2. The device of claim 1, wherein one or more apertured holders are provided on the walled enclosure for holding handled cleaning items, the apertured holders being integrally formed in the walled enclosure,
   further including a bucket holding component comprising a u-shaped bracket having two ends, wherein each end is integrally formed on and with said walled enclosure, and wherein said u-shaped bracket defines an opening through which a bucket may be placed and held therein, and
   further including a dust pan holding component comprising a bracket provided on the walled enclosure and configured to hold a dust pan, the bracket forming the dust pan holding component being integrally formed in the walled enclosure.

3. The device of claim 1, wherein the walled enclosure forms a common wall dividing said compartment storage space from said walled enclosure interior space.

4. The device of claim 1, including a handle connected to said rear wall.

5. The device of claim 4, wherein said handle is integrally provided with said rear wall.

6. The device of claim 1, wherein one or more apertured holders are provided on the walled enclosure for holding handled cleaning items, the apertured holders being integrally formed in the walled enclosure.

7. The device of claim 1, further including wheels mounted to the device for moving the device when desired.

8. The device of claim 7, the wheels being constructed from a material that resists corrosion from water and cleaning chemicals.

9. The device of claim 1, further including a dust pan holding component comprising a bracket provided on the walled enclosure and configured to hold a dust pan.

10. The device of claim 9, the bracket being integrally formed in the walled enclosure.

11. A refuse collecting device, comprising
   a walled enclosure having an opening therein, an interior space, wherein the walled enclosure is formed comprising a rear wall, a front wall, two side walls, and a floor;
   a first holding component for holding a roll of trash bags or a roll of paper towels, the first holding component for holding a roll of trash bags or a roll of paper towels comprising a pair of brackets individually and directly positioned on one of the walls of the walled enclosure, and a rod removably mountable to and extending between the brackets for holding a roll of trash bags or a roll of paper towels surrounding the rod; and
   a second holding component for holding a roll of trash bags or a roll of paper towels, the second holding component for holding a roll of trash bags or a roll of paper towels comprising a pair of brackets individually and directly positioned on another of the walls of the walled enclosure other than the wall for the pair of brackets for the first holding component, and a rod removably mountable to and extending between the brackets for holding a roll of trash bags or a roll of paper towels surrounding the rod;

a third holding component for holding a roll of trash bags or a roll of paper towels, the third holding component for holding a roll of trash bags or a roll of paper towels comprising a pair of brackets individually and directly positioned on one of the walls of the walled enclosure other than the wall for the pair of brackets for the first holding component and other than the wall for the pair of brackets for the second holding component, and a rod removably mountable to and extending between the brackets for holding a roll of trash bags or a roll of paper towels surrounding the rod;

wherein the first holding component, the second holding component, and the third holding component differ in size from one another to accommodate different sizes of trash bag rolls or paper towel rolls.

12. The device of claim 11, wherein one or more apertured holders are provided on the walled enclosure for holding handled cleaning items.

13. The refuse collecting device of claim 11, further including a first storage component for holding cleaning supplies, the first storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space.

14. The refuse collecting device of claim 13, further including a second storage component for holding cleaning supplies, the second storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space.

15. The refuse collecting device of claim 14, further including a third storage component for holding cleaning supplies, the third storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space.

16. A refuse collecting device, comprising a walled enclosure having an opening therein, an interior space, and a floor, a first storage component for holding cleaning supplies, the first storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space, a second storage component for holding cleaning supplies, the second storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space.

17. The refuse collecting device of claim 16, further including a third storage component for holding cleaning supplies, the third storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space.

18. The refuse collecting device of claim 17, further including a holding component for holding a roll of trash bags or a roll of paper towels, the holding component for holding a roll of trash bags or a roll of paper towels comprising a pair of brackets individually directly mounted to the walled enclosure, and a rod removably mountable to and extending between the brackets for holding a roll of trash bags or a roll of paper towels surrounding the rod.

19. A refuse collecting device comprising:

a) a walled enclosure having an opening therein, an interior space, a floor, and a wall extending upwardly away from the floor, the wall having an interior side;

b) a holding component for holding a roll of trash bags or a roll of paper towels, the holding component for holding a roll of trash bags or a roll of paper towels comprising a pair of brackets individually directly mounted to the walled enclosure, and a rod removably mountable to and extending between the brackets for holding a roll of trash bags or a roll of paper towels surrounding the rod;

c) a storage component for holding cleaning supplies, the storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space;

d) a first set of hooks imbedded into and extending from the walled enclosure for holding a trash bag open when the trash bag is placed in the interior space of the walled enclosure to line the interior space of the walled enclosure; and e) a second set of hooks imbedded into and extending from the interior side of the wall of the walled enclosure inside the walled enclosure for holding a trash bag open when the trash bag is placed in the interior space of the walled enclosure to line the interior space of the walled enclosure.

20. The refuse collecting device of claim 19, further including a second holding component for holding a roll of trash bags or a roll of paper towels, the second holding component for holding a roll of trash bags or a roll of paper towels comprising a pair of brackets individually directly positioned on the walled enclosure, and a rod removably mountable to and extending between the brackets for holding a roll of trash bags or a roll of paper towels surrounding the rod.

21. A refuse collecting device comprising:
a) a walled enclosure having an opening therein, an interior space and a floor;
b) a holding component for holding a roll of trash bags or a roll of paper towels, the holding component for holding a roll of trash bags or a roll of paper towels comprising a pair of brackets individually directly mounted to the walled enclosure, and a rod removably mountable to and extending between the brackets for holding a roll of trash bags or a roll of paper towels surrounding the rod; and
c) a storage component for holding cleaning supplies, the storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space; and further including
d) a bucket holding component for holding a bucket, the bucket holding component comprising a u-shaped bracket having two ends, wherein each end is directly mounted to the walled enclosure, and wherein said u-shaped bracket defines an opening through which a bucket may be placed and held therein.

22. A refuse collecting device comprising:
a) a walled enclosure having an opening therein, an interior space and a floor;
b) a holding component for holding a roll of trash bags or a roll of paper towels, the holding component for holding a roll of trash bags or a roll of paper towels comprising a pair of brackets individually directly mounted to the walled enclosure, and a rod removably mountable to and extending between the brackets for holding a roll of trash bags or a roll of paper towels surrounding the rod; and
c) a storage component for holding cleaning supplies, the storage component for holding cleaning supplies comprising a compartment integrally formed on and with the walled enclosure, the compartment having a storage space accessible from the exterior of the device, and wherein the walled enclosure forms a common wall dividing said compartment storage space from said walled enclosure interior space; and further including
d) a bucket holding component comprising a u-shaped bracket having two ends, wherein each end is integrally formed on and with said walled enclosure, and wherein said u-shaped bracket defines an opening through which a bucket may be placed and held therein.

23. A refuse collecting device comprising:
a) a walled enclosure having an opening therein, an interior space, wherein the walled enclosure is formed comprising a rear wall, a front wall, two side walls and a floor;
b) a plurality of storage components for holding cleaning supplies, each storage component for holding cleaning supplies comprising a compartment integrally formed on and with the walled enclosure, the compartment having a storage space accessible from the exterior of the device;
c) a set of hooks imbedded into and extending from the walled enclosure for holding a trash bag open when the trash bag is placed in the interior space of the walled enclosure to line the interior space of the walled enclosure;
d) the compartment of each storage component having a storage space accessible from the exterior of said device, and wherein said walled enclosure forms a common wall dividing each compartment storage space from said walled enclosure interior space;
e) a handle connected to said rear wall, and wherein said handle is integrally provided with said rear wall;
f) one or more apertured holders are provided on the walled enclosure for holding handled cleaning items, the apertured holders being integrally formed in the walled enclosure;
g) a bucket holding component for holding a bucket, the bucket holding component comprising a u-shaped bracket having two ends, wherein each end is directly mounted to the walled enclosure, and wherein said u-shaped bracket defines an opening through which a bucket may be placed and held therein;
h) a dust pan holding component comprising a bracket provided on the walled enclosure and configured to hold a dust pan, the bracket of the dust pan holding component being integrally formed in the walled enclosure;
i) a plurality of holding components, including a first holding component provided on the front wall of the walled enclosure, a second holding component provided on the left side wall of the walled enclosure, and a third holding component provided on the right side wall of the walled enclosure, each of said holding components comprising a pair of brackets and a rod held between said brackets, wherein the brackets of each pair of brackets are individually directly mounted to the walled enclosure, and wherein said rod of each holding component is compressible and expandable to securely engage the brackets for installation and removal therefrom;
j) means for moving the device comprising wheels constructed from a material that resists corrosion from water and cleaning chemicals; and
k) wherein said holding components differ in size from one another to accommodate different sizes of trash bag rolls or paper towel rolls.

24. A refuse collecting device comprising:
a) a walled enclosure having an opening therein, an interior space and a floor;
b) a holding component for holding a roll of trash bags or a roll of paper towels, the holding component for holding a roll of trash bags or a roll of paper towels comprising a pair of brackets individually directly mounted to the walled enclosure, and a rod removably mountable to and extending between the brackets for holding a roll of trash bags or a roll of paper towels surrounding the rod; and
c) a storage component for holding cleaning supplies, the storage component for holding cleaning supplies comprising a compartment integrally formed on and with the walled enclosure, the compartment having a storage space accessible from the exterior of the device;
wherein the walled enclosure is formed comprising a rear wall, a front wall, a left side wall, a right side wall, and a floor;
the storage compartment being integrally formed on and with the front wall of the walled enclosure; and further including
a second storage compartment being integrally formed on and with the left side wall of the walled enclosure, and
a third storage compartment being integrally formed on and with the right side wall of the walled enclosure;
the holding component for holding a roll of trash bags or a roll of paper towels being mounted to the front wall of the walled enclosure, and further including
a second holding component for holding a roll of trash bags or a roll of paper towels, the second holding component for holding a roll of trash bags or a roll of paper towels comprising a pair of brackets individually directly mounted to the left side wall of the walled enclosure, and a rod removably mountable to and extending between the brackets for holding a roll of trash bags or a roll of paper towels surrounding the rod, the second holding component being configured to be a different size than the holding component mounted on the front wall of the walled enclosure, and a third holding component for holding a roll of trash bags or a roll of paper towels, the third holding component for holding a roll of trash bags or a roll of paper towels comprising a pair of brackets individually directly mounted to the right side wall of the walled enclosure, and a rod removably mountable to and extending between the brackets for holding a roll of trash bags or a roll of paper towels surrounding the rod, the third holding component being configured to be a different size than the holding component mounted on the front wall of the walled enclosure and a different size than the holding component mounted on the left side wall of the walled enclosure.

25. The device of claim 24, wherein one or more apertured holders are provided on the walled enclosure for holding handled cleaning items, further including a bucket holding component for holding a bucket, the bucket holding component comprising a u-shaped bracket having two ends, wherein each end is directly mounted to the walled enclosure, and wherein said u-shaped bracket defines an opening through which a bucket may be placed and held therein, and wherein a dust pan holding component comprising a bracket is provided on the walled enclosure and is configured to hold a dust pan.

\* \* \* \* \*